(12) United States Patent
Kurtz et al.

(10) Patent No.: US 10,215,106 B2
(45) Date of Patent: Feb. 26, 2019

(54) SYSTEM AND METHOD FOR ADJUSTING EXHAUST VALVE TIMING

(71) Applicant: Ford Global Technologies, LLC, Dearborn, MI (US)

(72) Inventors: Eric Matthew Kurtz, Dearborn, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/389,072

(22) Filed: Dec. 22, 2016

(65) Prior Publication Data

US 2018/0179962 A1 Jun. 28, 2018

(51) Int. Cl.
*F02B 33/44* (2006.01)
*F02D 23/00* (2006.01)
*F02D 13/02* (2006.01)
*F01L 1/344* (2006.01)
*F02B 37/00* (2006.01)
*F02D 41/40* (2006.01)
*F02D 41/14* (2006.01)
*F02D 35/02* (2006.01)
*F02D 41/02* (2006.01)

(52) U.S. Cl.
CPC .......... *F02D 13/0249* (2013.01); *F01L 1/344* (2013.01); *F02B 37/00* (2013.01); *F02D 35/023* (2013.01); *F02D 41/024* (2013.01); *F02D 41/1402* (2013.01); *F02D 41/1446* (2013.01); *F02D 41/40* (2013.01); *F01L 2800/00* (2013.01); *F02D 41/1461* (2013.01); *F02D 2200/024* (2013.01); *F02D 2200/0802* (2013.01); *F02D 2250/14* (2013.01); *Y02T 10/144* (2013.01); *Y02T 10/18* (2013.01)

(58) Field of Classification Search
CPC ....... F02D 13/0249; F02D 41/40; F01L 1/344
USPC .......................... 60/605.1, 602; 701/101–105
See application file for complete search history.

(56) References Cited

U.S. PATENT DOCUMENTS

| | | | | |
|---|---|---|---|---|
| 4,995,351 | A * | 2/1991 | Ohkubo | ............ F02D 13/0215 123/90.11 |
| 7,832,197 | B2 | 11/2010 | Leone | |
| 8,744,733 | B2 | 6/2014 | Sane | |
| 2003/0221643 | A1* | 12/2003 | Kurihara | ................... F01L 9/02 123/90.15 |
| 2014/0046571 | A1 | 2/2014 | Cowgill et al. | |
| 2015/0275723 | A1* | 10/2015 | Koch | .................. F02D 13/0249 60/605.2 |

FOREIGN PATENT DOCUMENTS

EP 1054148 A2 * 11/2000 ............... F01L 9/04

* cited by examiner

*Primary Examiner* — Ngoc T Nguyen
(74) *Attorney, Agent, or Firm* — Julia Voutyras; McCoy Russell LLP

(57) ABSTRACT

Methods and systems for adjusting exhaust valve timing of an engine are described. In one example, exhaust valve timing of a compression ignition engine is adjusted responsive to a difference between a commanded exhaust valve opening timing and an actual exhaust valve opening timing, the actual exhaust valve opening timing determined from cylinder pressure.

20 Claims, 4 Drawing Sheets

SYSTEM AND METHOD FOR ADJUSTING EXHAUST VALVE TIMING

BACKGROUND/SUMMARY

A compression ignition engine may be fitted with an adjustable valve timing system to improve engine efficiency and power. The adjustable valve timing system may be comprised of one or more camshafts, a cam phase actuator, and timing chains that link the one or more camshafts to an engine crankshaft. The cam phase actuator may adjust a position of the one or more camshafts relative to a position of the camshaft, and lobes on the camshaft operate intake and/or exhaust valves of engine cylinders. Manufacturing tolerances may cause errors between a commanded intake and/or exhaust valve opening time and an actual intake and/or exhaust valve opening time between different vehicles. An error in cylinder valve timing may increase engine emissions or reduce engine power. Therefore, it may be desirable to control actual cylinder valve timings to commanded valve timings so that desired engine emissions and performance may be more consistent over a fleet of vehicles.

The inventors herein have recognized the above-mentioned disadvantages and have developed an engine operating method, comprising: adjusting a commanded exhaust valve opening timing via a controller in response to an exhaust valve opening timing determined from a rate of change of pressure in a cylinder of an engine.

By adjusting a commanded exhaust valve opening time responsive to an exhaust valve opening timing determined via a rate of change in cylinder pressure, it may be possible to provide the technical result of improving exhaust valve timing control. Further, by providing more precise exhaust valve timing, control of engine expansion work and engine emissions may be improved. In one example, a rate of change of cylinder pressure during a prescribed crankshaft angle window is a basis for determining exhaust valve opening timing. The commanded exhaust valve timing may be adjusted responsive to the exhaust valve opening timing determined from the rate of change of cylinder pressure during the prescribed crankshaft angle window.

The present description may provide several advantages. For example, the approach may improve exhaust valve timing control. Further, the approach may reduce engine emissions and improve engine fuel economy. Further still, the approach may be suitable for adjusting exhaust valve timing of a cylinder bank in response to output of a single pressure sensor located in one cylinder of a cylinder bank.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
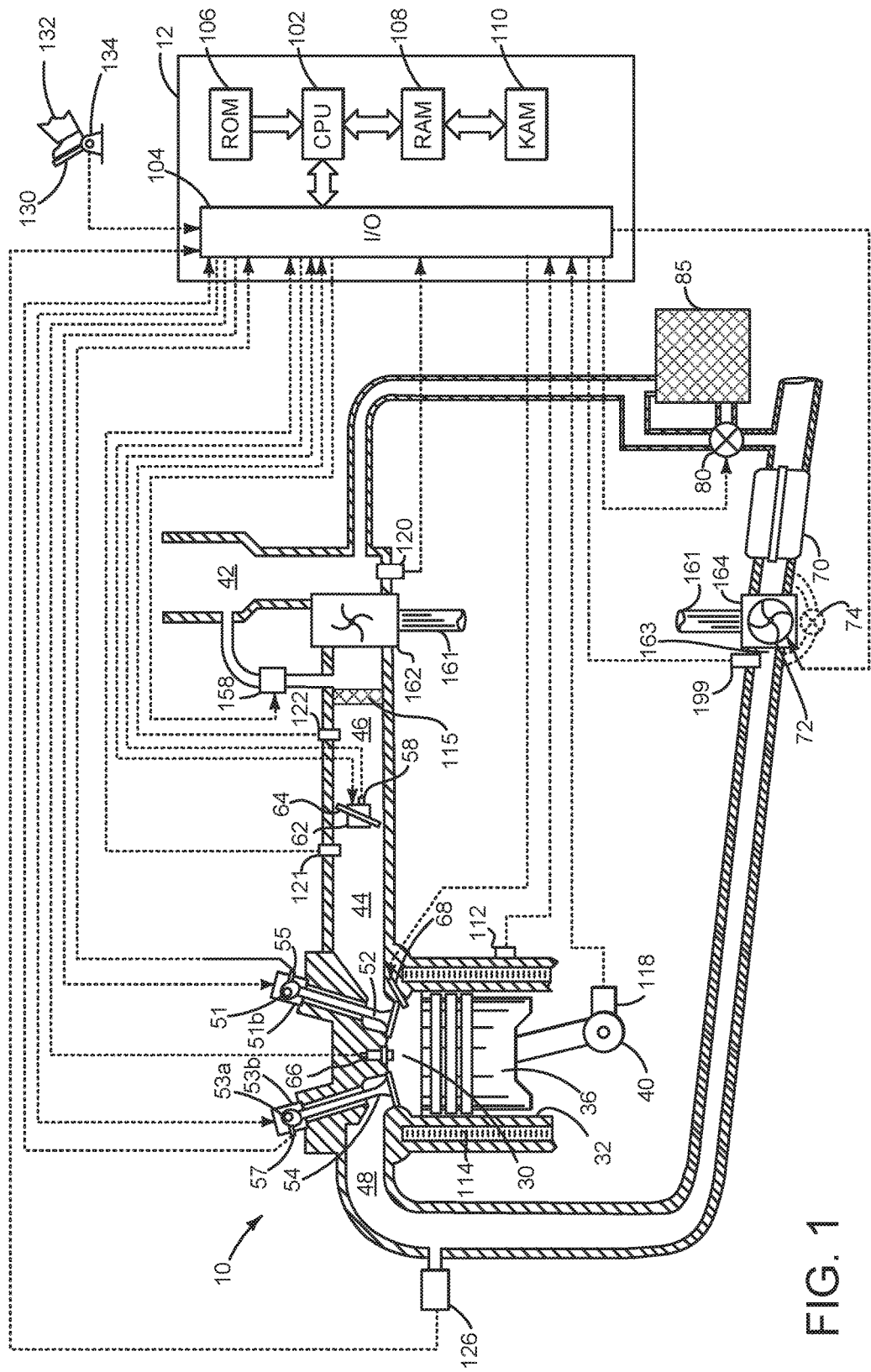
FIG. 1 shows a schematic depiction of an engine.
Figure 2:
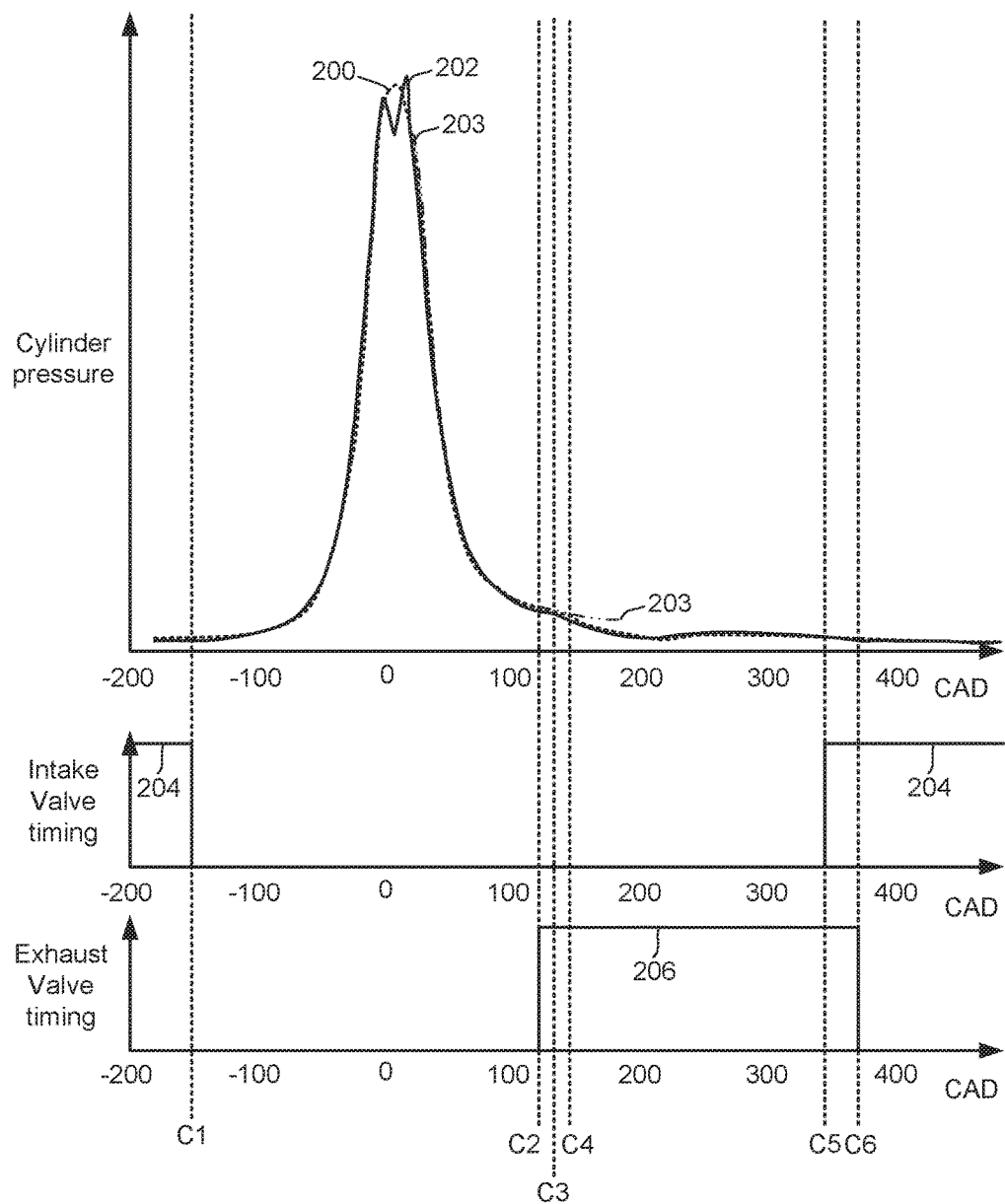
FIG. 2 shows example plots of cylinder pressure and valve timing during a cycle of the cylinder.
Figure 3:
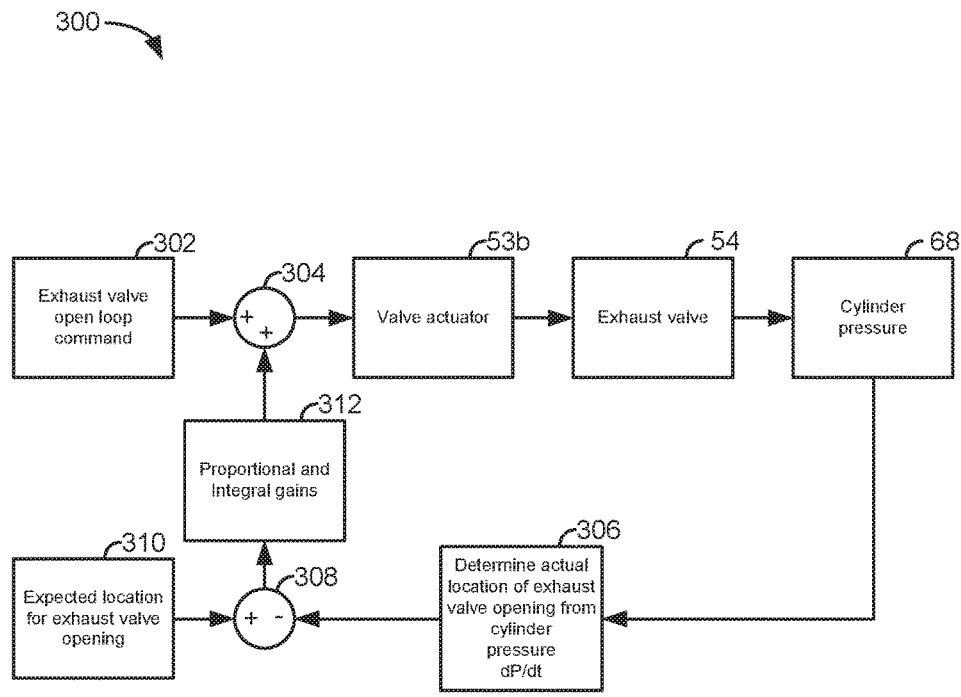
FIG. 3 shows an example block diagram of a valve timing controller.
Figure 4:
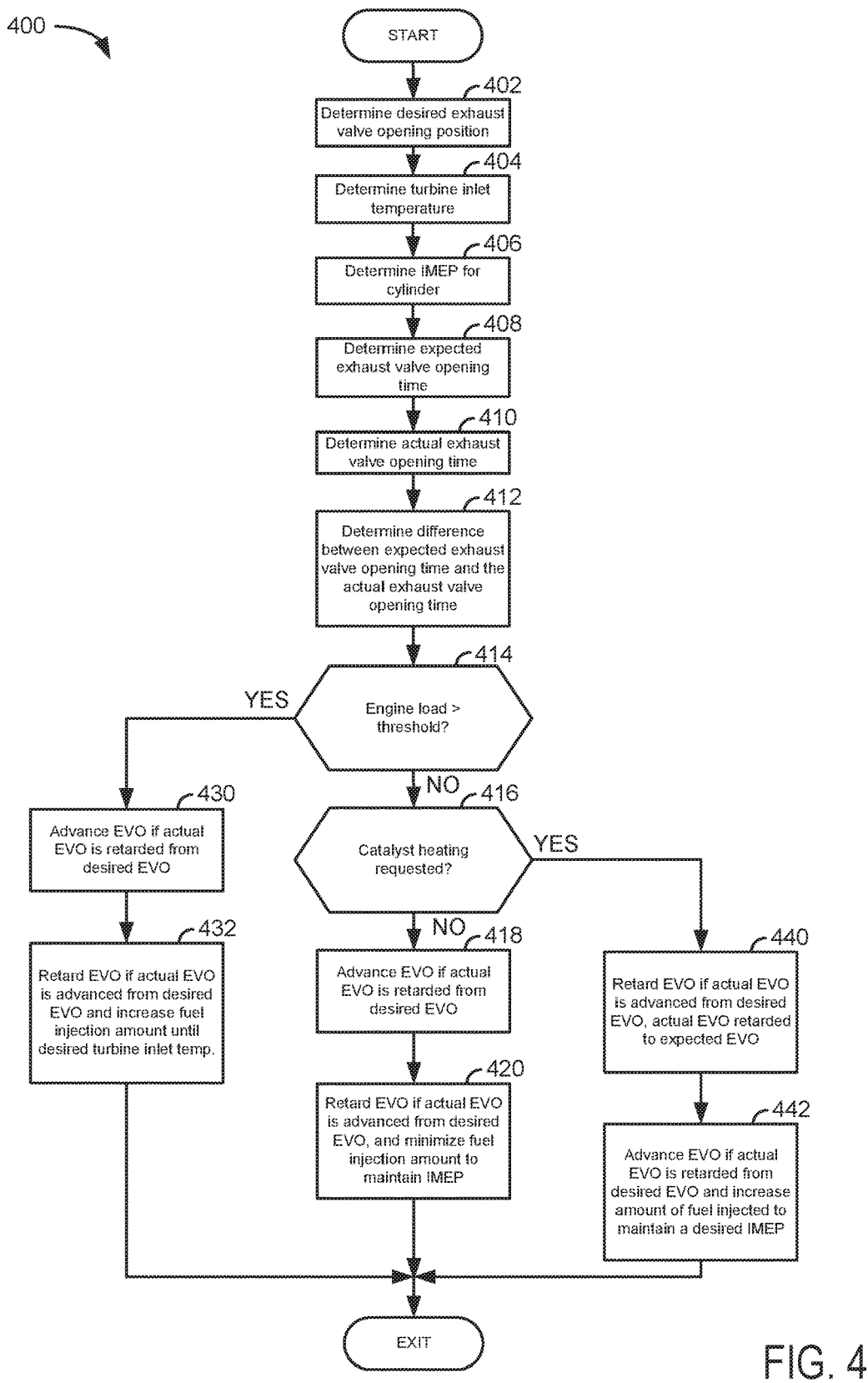
FIG. 4 shows an example method for operating an engine.

The present description is related to improving combustion within cylinders of an internal combustion engine in response to pressure sensor feedback from pressure sensors located in cylinders. FIG. 1 shows an example cylinder of an internal combustion engine. FIG. 2 shows an exemplary cylinder pressure profile captured via a cylinder pressure sensor. A block diagram of an example valve timing controller is shown in FIG. 3. Finally, a method for operating an engine with variable valve timing is shown in FIG. 4.

Referring to FIG. 1, internal combustion engine 10, comprising a plurality of cylinders, one cylinder of which is shown in FIG. 1, is controlled by electronic engine controller 12. Electrical connections are indicted by dashed lines. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51a and an exhaust cam 53a. The position of intake cam 51a may be determined by intake cam sensor 55. The position of exhaust cam 53a may be determined by exhaust cam sensor 57. An intake camshaft phase adjusting actuator 51b may adjust a position of intake cam 51a relative to a position of crankshaft 40. An exhaust camshaft phase adjusting actuator 53b may adjust a position of exhaust cam 53a relative to a position of crankshaft 40.

Fuel injector 66 is shown positioned to inject fuel directly into combustion chamber 30, which is known to those skilled in the art as direct injection. Fuel injector 66 delivers fuel in proportion to a pulse width from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump. Engine 10 does not include an electric ignition system. Instead, ignition is provided via compression.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases enter turbocharger turbine inlet 163 and spin turbine 164 which is coupled to compressor 162 via shaft 161. Charge air cooler 115 cools air compressed by compressor 162. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, waste gate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel ignites via compression ignition as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

Pressure in combustion chamber 30 may be sampled via pressure sensor 68. In some examples, pressure sensor 68 may also include a glow plug for warming combustion chamber 30. For example, at lower engine temperatures, glow plug 68 may convert electrical energy into thermal energy so as to raise a temperature in combustion chamber 30. By raising temperature of combustion chamber 30, it may be easier to ignite a cylinder air-fuel mixture via compression. Controller 12 adjusts current flow and voltage supplied to glow plug 68. In this way, controller 12 may adjust an amount of electrical power supplied to glow plug 68.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human driver 132; a measurement of engine manifold pressure (MAP) from pressure sensor 121 coupled to intake manifold 44; boost pressure from pressure sensor 122 exhaust gas oxygen concentration from oxygen sensor 126; a turbine inlet temperature from sensor 199; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provide for an engine system, comprising: an engine including a cylinder, a crankshaft position sensor, and an exhaust valve; a pressure sensor protruding into a cylinder; and a controller including instructions stored in non-transitory memory to determine a rate of change of pressure in the cylinder from output of the pressure sensor, and to adjust a commanded opening time of the exhaust valve in response to the rate of change of pressure in the cylinder. The engine system further comprises additional instructions to determine a crankshaft angle at which the rate of change of the pressure sensor exceeds a threshold. The engine system further comprises additional controller instructions to adjust the commanded opening timing of the exhaust valve in response to the crankshaft angle. The engine system includes where the crankshaft angle is an actual exhaust valve opening timing. The engine system further comprises additional instructions to advance the commanded opening timing of the exhaust valve in response to a catalyst heating request when exhaust valve opening timing determined from the rate of change of pressure in the cylinder is retarded from the commanded opening timing of the exhaust valve.

Referring now to FIG. 2, exemplary plots of cylinder pressure and valve timing during a cycle of the cylinder is shown. FIG. 2 includes three plots that are time aligned. The horizontal axis of each plot represents crankshaft angle degrees and the crankshaft angle degrees change as the engine is rotated. The dotted vertical lines represent crankshaft angles of interest.

The first plot from the top of FIG. 2 is a plot of cylinder pressure verses crankshaft angle relative to top-dead-center of the cylinder. Top-dead-center of the cylinder is zero crankshaft angle degrees (CAD). The vertical axis represents cylinder pressure and cylinder pressure increases in the direction of the vertical axis arrow. The horizontal axis represents CAD and the CADS are indicated along the horizontal axis. The dotted line 200 represents an expected or calculated cylinder pressure determined via a model. The solid line 202 represents cylinder pressure observed via a pressure sensor (e.g., actual cylinder pressure). Dash double dot line 203 is modeled exhaust pressure as determined via a model of polytropic expansion in the cylinder. The expected and polytropic cylinder pressures are equal to the actual cylinder pressure when the expected cylinder pressure trace 200 and polytropic pressure trace 203 are not visible.

The second plot from the top of FIG. 2 is a plot of intake valve timing versus crankshaft angle degree for a cylinder. The cylinder is the same cylinder for which pressure is shown in the first plot. The vertical axis represents intake valve timing and the intake valve is open when trace 204 is at a higher level near the vertical axis arrow. The horizontal axis represents CAD and the CADS are indicated along the horizontal axis.

The third plot from the top of FIG. 2 is a plot of exhaust valve timing versus crankshaft angle degree for a cylinder. The cylinder is the same cylinder for which pressure is shown in the first plot. The vertical axis represents exhaust valve timing and the exhaust valve is open when trace 206 is at a higher level near the vertical axis arrow. The horizontal axis represents CAD and the CADS are indicated along the horizontal axis.

Before crankshaft angle C1, the actual cylinder pressure 202 and the expected cylinder pressure 200 are at low levels because the intake valve is open, which allows the cylinder pressure to approach intake manifold pressure. The exhaust valves are closed.

At crankshaft angle C1, the actual cylinder pressure and the expected cylinder pressure remain near intake manifold pressure and the intake valves are closed. The exhaust valves are also closed. As the engine rotates away from crankshaft angle C1 and toward top-dead-center compression stroke (e.g., zero crankshaft degrees), the actual pressure in the cylinder 202 rises as the piston approaches the cylinder head. The expected cylinder pressure also increases as the cylinder approaches top-dead-center compression stroke.

Between crankshaft angle C1 and crankshaft angle C2, pressure in the cylinder decreases as combusted gases expand in the expansion stroke and urge the piston toward bottom-dead-center expansion stroke. The expected cylinder pressure 200, actual cylinder pressure 202, and modeled polytropic expansion pressure 203 are very close to one another.

At crankshaft angle C2, the exhaust valves begin to open in response to the camshaft lobes of the exhaust camshaft moving off a base circle to a ramp at a location where valve lifters engage the exhaust camshaft lobes. The exhaust valves are commanded open at the crankshaft angle C2 via indexing a camshaft phase actuator to a commanded position that corresponds to a position where the exhaust valves open at the commanded timing. For example, if exhaust valves are commanded to open at 140 crankshaft degrees after top-dead-compression compression stroke, the camshaft phase actuator is commanded to a position where it is expected that the exhaust valves will begin to open at 140 crankshaft degrees after top-dead-compression compression stroke.

The actual cylinder pressure decreases at crankshaft angle C3 in response to the exhaust valves opening. The change in the actual cylinder pressure that corresponds to exhaust valve opening may be recognized by a change in the rate of change of actual cylinder pressure with respect to time or crankshaft angle degree (e.g., dP/dt or dP/dCAD) or change in magnitude of the rate of change of actual cylinder pressure exceeding a threshold. It should be noted that there is a delay between C2 and C3 that may be attributed to valve seat geometry and other factors. The expected cylinder pressure 200 and the modeled polytropic expansion pressure in the cylinder 203 exhibit no similar rate of change in pressure as the actual cylinder pressure 202. The rate of change of actual cylinder pressure 202 may be compared (e.g., subtracted) from the expected cylinder pressure 200 and/or the modeled polytropic expansion pressure in the cylinder. If the result is greater than a threshold, it may be determined that there is a difference between the actual opening valve timing 202 and the expected 200 cylinder pressure and/or the modeled polytropic expansion pressure 203 indicative of a exhaust valve opening timing error.

In this example, the expected cylinder pressure begins to decrease due to exhaust valve opening at crankshaft angle C4. The change in the expected cylinder pressure that corresponds to exhaust valve opening may be recognized by a change in the rate of change of expected cylinder pressure with respect to time or crankshaft angle degree (e.g., dP/dt or dP/dCAD) or change in magnitude of the rate of change of expected cylinder pressure exceeding a threshold. Thus, the actual opening of the exhaust valve is advanced from the expected opening of the exhaust valve. Because the actual exhaust valve opening time is earlier than the expected exhaust valve opening time, expansion work may be decreased and temperature of exhaust gases entering the exhaust system and emissions control devices in the engine's exhaust system may increase. Consequently, it may be desirable to adjust the exhaust valve timing so that the actual exhaust valve opening time is moved to crankshaft angle C4. The modeled polytropic expansion pressure continues on without a change after crankshaft angle C4 and its determination ceases shortly thereafter.

At crankshaft angle C5, the cylinder's intake valve begins to open. Opening the intake valve lowers pressure in the cylinder and allows fresh air to enter the cylinder. The exhaust valve closes at crankshaft angle C6 so that exhaust gases are not drawn back into the cylinder.

Thus, a difference in a rate of change between expected cylinder pressure and actual cylinder pressure may be a basis for adjusting the exhaust valve opening command so that the actual cylinder pressure aligns with the expected cylinder pressure when the exhaust valve opening is commanded. For example, the commanded exhaust valve opening timing may be advanced if the actual exhaust valve opening time determined from the rate of change of cylinder pressure with respect to time or crankshaft angle degree (e.g., dP/dt or dP/dCAD) is retarded from the exhaust valve opening timing determined from a change in expected cylinder pressure versus time or crankshaft angle.

Referring now to FIG. 3, an example controller block diagram for adjusting exhaust valve timing is shown. Controller 300 may be implemented in the system shown in conjunction with the method of FIG. 4.

Controller 300 receives a desired exhaust valve opening time at 302. The desired exhaust valve opening time may be empirically determined and stored in memory. In one example, exhaust valve opening timings are stored in a table that is indexed via engine speed and engine load. The table outputs the desired exhaust valve timing (e.g., exhaust valve opening 160 crankshaft angle degrees after top dead center compression stoke), which is input to summing junction 304. Summing junction 304 adds the desired exhaust valve opening time with the output of an exhaust valve timing controller 312. Output of summing junction 304 is used to command an exhaust valve actuator 53b. In one example, the desired exhaust valve opening time is converted into a desired exhaust valve actuator position and the exhaust valve actuator is commanded to the desired exhaust valve actuator position.

The exhaust valve 54 opens and closes responsive to the exhaust valve actuator and the commanded exhaust valve position. The timing of exhaust valve 54 affects cylinder pressure 68 during a cycle of the cylinder in which the exhaust valves reside. Opening the exhaust valve early may decrease pressure in the cylinder while opening the exhaust valve late may increase expansion work of the cylinder. Pressure in the cylinder with the adjusted valve timing is sampled via a pressure sensor to provide an actual cylinder pressure. The change in actual cylinder pressure with respect to time or crankshaft angle (e.g., differential pressure dP/dt or dP/dCAD) is determined at block 306.

In one example, the differential pressure is determined via subtracting a last past cylinder pressure sample value from a most recent cylinder pressure sample value and dividing the result by a difference between the time between the most recent cylinder pressure sample and the last past cylinder pressure sample. Alternatively, the differential pressure is determined via subtracting a last past cylinder pressure sample value from a most recent cylinder pressure sample value and dividing the result by a crankshaft angle difference between the crankshaft angle of the most recent cylinder pressure sample and the crankshaft angle of the last past cylinder pressure sample.

The differential pressure may be determined during a particular crankshaft angle window (e.g., a sampling window for determining exhaust valve opening timing of between 90 crankshaft degrees after top dead center compression stroke and 90 degrees after exhaust stroke bottom-dead-center) or over an entire cylinder cycle to determine the actual position where the exhaust valve opens. In one example, the exhaust valve opening time at 306 may be determined when a value of the pressure differential has a magnitude greater than a threshold value when engine position is within the sampling window for determining exhaust valve opening. The engine crankshaft angle where the pressure differential magnitude exceeds the threshold value (e.g., the actual exhaust valve opening location or timing) is the actual exhaust valve opening time and it is output from 306 to summing junction 308.

At summing junction 308, the actual engine crankshaft angle where the exhaust valve opens is subtracted from the expected cylinder pressure angle where the exhaust valve opens. The expected cylinder pressure angle where the exhaust valve opens 310 may be empirically determined and stored to a table or function in memory that is indexed via engine speed and engine load. The table or function outputs the expected cylinder pressure angle where the exhaust valve opens. Alternatively, the expected cylinder pressure angle where the exhaust valve opens may be determined via an analytic model of cylinder pressure. The output of summing junction 308 is an exhaust valve opening timing error and it is input to a controller at 312.

Controller 312 provides an adjustment to the presently commanded desired exhaust valve timing that drives the actual exhaust valve timing to the desired exhaust valve timing. In one example, controller 312 is a proportional/integral controller that applies proportional and integral gains to the exhaust valve opening timing error. The output of controller 312 is input to summing junction 304.

Thus, controller 300 adjusts a desired exhaust valve opening timing value in response to feedback of an actual exhaust valve opening time. The actual exhaust valve opening time determined from a differential cylinder pressure with respect to time or crankshaft angle. In this way, the effects of manufacturing variation that may change exhaust valve opening timings and exhaust valve closing timings may be reduced. Note that adjusting exhaust valve opening time also adjusts exhaust valve closing time for many cam operated exhaust valves.

Referring now to FIG. 4, a method for operating an engine is shown. At least portions of the method of FIG. 4 may be incorporated as instructions stored in non-transitory memory of a controller. Further, other portions of the method of FIG. 4 may be carried out as actions performed in the physical world via an individual and/or a controller. The method of FIG. 4 may be applied to a single engine cylinder, or alternatively, the method of FIG. 4 may be applied to each engine cylinder.

At 402, method 400 determines a desired exhaust valve opening time or crankshaft angle. In one example, empirically determined exhaust valve opening timings or crankshaft angles are stored in a table or function in controller memory. Values stored in the table or function are determined via indexing the table or function based on engine speed and engine load. For example, the table may include a plurality of rows from which values may be extracted. An engine load value may point to a row in the table corresponding to the present engine load. The row includes exhaust valve opening timings for the present engine load. The table also may include a plurality of columns from which values may be extracted. An engine speed value may point to a column in the table corresponding to the present engine speed. The column includes valve opening timings for the present engine speed. The present engine speed and present engine load correspond to a unique exhaust valve opening timing that may be output from the table at the row and columns corresponding to the present engine speed and load. If a particular engine speed and load do not index a particular cell or location in the table or function, entries in the table or function may be interpolated between to determine the desired exhaust valve opening timing. Method 400 proceeds to 404 after the desired exhaust valve opening time is determined.

At 404, method 400 determines a turbocharger turbine inlet temperature. In one example, method 400 senses turbocharger turbine inlet temperature via a temperature sensor to determine turbocharger turbine inlet temperature. In other examples, turbocharger inlet temperature may be estimated based on engine speed and load. Method 400 proceeds to 406 after determining turbocharger turbine inlet temperature.

At 406, method 400 determines indicated mean effective cylinder pressure (IMEP). In one example, IMEP is determined via a cylinder pressure sensor as is known in the art. Method 400 proceeds to 408 after IMEP for an engine cylinder is determined.

At 408, method 400 determines expected exhaust valve opening time. In one example, the expected cylinder pressure angle where the exhaust valve opens may be empirically determined and stored to a table or function in memory that is indexed via engine speed and engine load. The table or function outputs the expected cylinder pressure angle where the exhaust valve opens.

Alternatively, method 400 may determine the polytropic expansion pressure in the cylinder via an analytical model. The analytic model may include inputs for engine speed, engine air flow, amount of fuel delivered to the cylinder, the cetane level of the fuel, engine rotational position, commanded exhaust valve opening time, and other engine operating conditions. Method 400 proceeds to 410 after the expected exhaust valve opening position is determined.

At 410, method 400 determines the actual exhaust valve opening time or crankshaft location. In one example, pressure in the cylinder of the cylinder for which it is desired to determine exhaust valve opening time is sampled via pressure sensor to provide an actual cylinder pressure. Engine position and/or time are sampled and stored along with the actual cylinder pressure. The change in actual cylinder pressure with respect to time or crankshaft angle (e.g., differential pressure dP/dt or dP/dCAD) is determined from the actual cylinder pressure.

The differential pressure is determined via subtracting a last past cylinder pressure sample value from a most recent or current cylinder pressure sample value and dividing the result by a difference between the time between the most recent cylinder pressure sample and the last past cylinder pressure sample. Alternatively, the differential pressure is determined via subtracting a last past cylinder pressure sample value from a most recent cylinder pressure sample value and dividing the result by a crankshaft angle difference between the crankshaft angle of the most recent cylinder pressure sample and the crankshaft angle of the last past cylinder pressure sample.

The differential pressure may be determined during a particular crankshaft angle window (e.g., a sampling window for determining exhaust valve opening timing of between 90 crankshaft degrees after top dead center compression stroke and 90 degrees after exhaust stroke bottom-dead-center) or over an entire cylinder cycle to determine the actual position where the exhaust valve opens. Thus, in some examples, the pressure sampling for the cylinder may occur only during the sampling window of each cylinder cycle for the cylinder. The exhaust valve opening time may be determined from a value of the pressure differential that has a magnitude greater than a threshold value when engine position is within the sampling window for determining exhaust valve opening. The engine crankshaft angle where the pressure differential magnitude exceeds the threshold value (e.g., the actual exhaust valve opening location or timing) is the actual exhaust valve opening time. In addition, the actual exhaust valve opening time or crankshaft position may be compensated via adding or subtracting an offset value from the actual exhaust valve opening time as determined from cylinder pressure to compensate for valve seat geometry and other engine conditions that may result in a difference between a commanded exhaust valve opening time and an actual exhaust valve opening time determined from cylinder pressure.

In another example, the actual exhaust valve opening timing may be determined via comparing a rate of change of measured cylinder pressure (e.g., actual cylinder pressure) to a modeled polytropic expansion modeled cylinder pressure. In particular, exhaust valve opening timing may be estimated to be a crankshaft angle where a rate of change of measure cylinder pressure or actual cylinder pressure exceeds a rate of change of modeled polytropic cylinder pressure rate of change by a threshold amount. This crankshaft angle may be determined via subtracting the actual cylinder pressure from the modeled polytropic cylinder pressure. Method 400 proceeds to 412 after determining the actual exhaust valve opening position.

At 412, method 400 determines a difference between the expected exhaust valve opening time and the actual exhaust valve opening time. In particular, method 400 subtracts the actual exhaust valve opening time determined at 410 from the expected exhaust valve opening time determined at 408. Method 400 proceeds to 414.

At 414, method 400 judges if engine load is greater than a threshold. In one example, the threshold load is a higher engine load (e.g., load greater than 1). If method 400 judges that engine load is greater than a threshold engine load, the answer is yes and method 400 proceeds to 430. Otherwise, the answer is no and method 400 proceeds to 416.

At 430, method 400 advances EVO if the actual EVO determined at 410 is retarded from the desired or commanded EVO. For example, if the desired or commanded EVO is 15 crankshaft degrees before bottom-dead-center exhaust stroke, and the actual EVO is determined to be bottom-dead-center exhaust stroke, EVO is advanced to that the actual EVO approaches the commanded value of EVO. Method 400 proceeds to 432.

At 432, method 400 retards EVO if the actual EVO is advanced from the desired or expected EVO. Actual EVO is retarded to the desired or expected EVO and the amount of fuel injected is increased until the turbocharger inlet temperature reaches a desired turbocharger inlet temperature. Additional fuel is not injected to engine cylinders after the desired turbocharger turbine inlet temperature is reached. Method 400 proceeds to exit after EVO and fuel injection amount are adjusted.

At 416, method 400 judges if catalyst or exhaust emissions device heating is requested. In one example, exhaust emissions device heating may be requested if regeneration of the exhaust emissions device is requested or if a temperature of the exhaust gas emissions device is less than a threshold. If method 400 judges that catalyst or exhaust emissions device heating is requested, the answer is yes and method 400 proceeds to 440. Otherwise, the answer is no and method 400 proceeds to 418. The engine may be considered to be at part load if the answer is no.

At 440, method 400 method 400 retards EVO if the actual EVO is advanced from the desired or expected EVO. The actual EVO is retarded until actual EVO is equal to desired or expected EVO. Thus, once the actual EVO matches the desired or expected EVO, no additional EVO adjustments are performed. Method 400 proceeds to 442.

At 442, method 400 method 400 advances EVO to increase emissions device heating if the actual EVO is retarded from the desired or expected EVO. The amount EVO is advanced is limited or constrained based on the desired turbocharger turbine inlet temperature. For example, if actual EVO is retarded 5 crankshaft angle degrees from desired or expected EVO, EVO may be advanced by up to 5 crankshaft angle degrees. However, if turbocharger inlet temperature reaches a desired turbocharger inlet temperature after providing 3 crankshaft angle degrees of advance, additional EVO advance is not provided. In addition, an amount of fuel injected to the engine may be increased to maintain IMEP for the engine cylinders at a level before EVO was advanced. Further, boost pressure may also be increased to compensate for the additional injected fuel. Method 400 proceeds to exit after EVO and fuel injection amount are adjusted.

At 418, method 400 advances EVO if actual EVO is retarded from the desired or expected EVO. The actual EVO is advanced to the desired or expected EVO; however, actual EVO advance may be suspended to being less advanced that the desired or expected EVO if turbocharger turbine inlet temperature reaches a threshold temperature. Method 400 proceeds to 420.

At 420, method 400 retards EVO if the actual EVO is advanced from desired EVO. Further, method 400 reduces an amount of fuel injected to engine cylinders until a desired IMEP is provided in the cylinders. For example, if the desired IMEP is X and the present IMEP is greater than X, the amount of fuel injected is reduced until IMEP equals X. Method 400 also monitors turbocharger inlet temperature while the amount of fuel injected to engine cylinders is being reduced. If turbocharger inlet temperature is reduced to less than a threshold temperature, the reduction in the amount of injected fuel is ceased. In addition, method 400 may reduce boost pressure when the amount of fuel injected to the engine is reduced. Method 400 proceeds to exit.

The EVO adjustments of FIG. 4 may be adjusted via a controller as shown and described in FIG. 3. In particular, EVO may be advanced or retarded such that actual EVO matches desired or expected EVO. In this way, exhaust valve timing may be adjusted responsive to pressure in a cylinder. In particular, a rate of change of cylinder pressure may be a basis for determining exhaust valve opening timing. The exhaust valve opening timing as determined from cylinder pressure may then provide exhaust timing feedback to a controller. The controller may then adjust commanded exhaust valve timing in response to the exhaust valve opening timing determined from the exhaust pressure so that actual exhaust valve opening timing may match desired or commanded exhaust valve opening timing.

The method of FIG. 4 may be suitable for adjusting exhaust valve timing for a bank of engine cylinders via output of a single pressure sensor positioned in a single cylinder. For example, a V8 engine includes two banks of cylinders. Exhaust valve timing of a first bank of cylinders may be adjusted in response to pressure in a cylinder located in the first bank of cylinders. Exhaust valve timing of a second bank of cylinders may be adjusted in response to pressure in a cylinder located in the second bank of cylinders.

Thus, the method of FIG. 4 provide for an engine operating method, comprising: adjusting a commanded exhaust valve opening timing via a controller in response to an exhaust valve opening timing determined from a rate of change of pressure in a cylinder of an engine. The method includes where the rate of change of pressure is determined via subtracting a value of a last past cylinder pressure sample from a value of a current cylinder pressure sample. The method includes where adjusting the commanded exhaust valve opening timing includes adjusting the commanded exhaust valve opening timing in response to a difference between the commanded exhaust valve opening timing and an actual exhaust valve opening timing.

In some examples, the method includes where the actual exhaust valve opening timing is determined from the rate of change of pressure in the cylinder of the engine. The method further comprises sampling a pressure of the cylinder to determine the rate of change of pressure in the cylinder. The method further comprises sampling the pressure of the cylinder only during a prescribed crankshaft angle window. The method further comprises adjusting the commanded exhaust valve opening timing in response to adding or subtracting an offset value to the exhaust valve opening timing.

The method of FIG. 4 also provides for an engine operating method, comprising: adjusting a commanded exhaust valve opening timing via a controller in response to an exhaust valve opening timing determined from a rate of change of pressure in a cylinder of an engine; retarding the commanded exhaust valve opening timing via the controller in response to the exhaust valve opening timing determined from the rate of change of pressure in the cylinder of the engine being advance of the commanded exhaust valve opening timing; and increasing an amount of fuel injected to the engine via the controller in response to the exhaust valve opening timing determined from the rate of change of pressure in the cylinder of the engine being advance of the commanded exhaust valve opening timing and engine load being greater than a threshold. The method further comprises ceasing to increase the amount of fuel injected to the engine via the controller in response to a desired turbocharger inlet temperature being reached at a turbocharger turbine inlet. The method further comprises advancing exhaust valve opening timing when the exhaust valve opening timing determined from the rate of change of pressure in a cylinder of an engine is retarded from the commanded exhaust valve opening timing and increasing an amount of fuel injected to the engine in response to advancing exhaust valve opening timing.

In some examples, the method further comprises retarding exhaust valve opening timing when the exhaust valve opening timing determined from the rate of change of pressure in a cylinder of an engine is advanced from the commanded exhaust valve opening timing and reducing an amount of fuel injected to the engine while maintaining a desired indicated mean effective pressure in the cylinder. The method further comprises sampling a pressure of the cylinder to determine the rate of change of pressure in the cylinder. The method further comprises sampling the pressure of the cylinder only during a prescribed crankshaft angle window. The method includes where the prescribed crankshaft angle window is between 90 crankshaft degrees after top dead center compression stroke and 90 degrees after exhaust stroke bottom-dead-center of the cylinder. The method includes where the engine is a compression ignition engine.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
adjusting a commanded exhaust valve opening timing via a controller in response to an exhaust valve opening timing determined from a rate of change of pressure in a cylinder of an engine; and
decreasing an amount of fuel injected to the engine via the controller in response to the exhaust valve opening timing determined from the rate of change of pressure in the cylinder of the engine being in advance of the commanded exhaust valve opening timing and engine load being greater than a threshold.

2. The method of claim 1, where the rate of change of pressure is determined via subtracting a value of a last past cylinder pressure sample from a value of a current cylinder pressure sample, and further comprising:
advancing the commanded exhaust valve opening timing via the controller according to the exhaust valve opening timing determined from the rate of change of pressure in the cylinder of the engine being in advance of the commanded exhaust valve opening timing.

3. The method of claim 1, where adjusting the commanded exhaust valve opening timing includes adjusting the commanded exhaust valve opening timing in response to a difference between the commanded exhaust valve opening timing and an actual exhaust valve opening timing.

4. The method of claim 3, where the actual exhaust valve opening timing is determined from the rate of change of pressure in the cylinder of the engine.

5. The method of claim 1, further comprising sampling a pressure of the cylinder to determine the rate of change of pressure in the cylinder and subtracting the rate of change of pressure in the cylinder to a modeled polytropic cylinder pressure.

6. The method of claim 5, further comprising sampling the pressure of the cylinder only during a prescribed crankshaft angle window.

7. The method of claim 1, further comprising adjusting the commanded exhaust valve opening timing in response to adding or subtracting an offset value to the exhaust valve opening timing determined from the rate of change of pressure in the cylinder of the engine.

8. An engine operating method, comprising:
adjusting a commanded exhaust valve opening timing via a controller in response to an exhaust valve opening timing determined from a rate of change of pressure in a cylinder of an engine;
retarding the commanded exhaust valve opening timing via the controller in response to the exhaust valve opening timing determined from the rate of change of pressure in the cylinder of the engine being in advance of the commanded exhaust valve opening timing; and
increasing an amount of fuel injected to the engine via the controller in response to the exhaust valve opening timing determined from the rate of change of pressure in the cylinder of the engine being advance of the commanded exhaust valve opening timing and engine load being greater than a threshold.

9. The method of claim 8, further comprising ceasing to increase the amount of fuel injected to the engine via the controller in response to a desired turbocharger inlet temperature being reached at a turbocharger turbine inlet.

10. The method of claim 8, further comprising advancing exhaust valve opening timing when the exhaust valve opening timing determined from the rate of change of pressure in the cylinder of the engine is retarded from the commanded exhaust valve opening timing and increasing the amount of fuel injected to the engine in response to advancing exhaust valve opening timing.

11. The method of claim 8, further comprising retarding exhaust valve opening timing when the exhaust valve opening timing determined from the rate of change of pressure in the cylinder of the engine is advanced from the commanded exhaust valve opening timing and reducing the amount of fuel injected to the engine while maintaining a desired indicated mean effective pressure in the cylinder.

12. The method of claim 8, further comprising sampling a pressure of the cylinder to determine the rate of change of pressure in the cylinder.

13. The method of claim 12, further comprising sampling the pressure of the cylinder only during a prescribed crankshaft angle window.

14. The method of claim 13, where the prescribed crankshaft angle window is between 90 crankshaft degrees after a top dead center compression stroke and 90 degrees after an exhaust stroke bottom-dead-center of the cylinder.

15. The method of claim 8, where the engine is a compression ignition engine.

16. An engine system, comprising:
an engine including a cylinder, a crankshaft position sensor, and an exhaust valve;
a pressure sensor protruding into the cylinder; and
a controller including instructions stored in non-transitory memory to determine a rate of change of a pressure in the cylinder from output of the pressure sensor, and instructions to retard a commanded opening timing of the exhaust valve and increase an amount of fuel injected to the engine via the controller while a turbocharger inlet temperature is less than a desired turbocharger inlet temperature in response to the rate of change of pressure in the cylinder indicating actual exhaust valve opening is advanced from a desired exhaust valve opening.

17. The engine system of claim 16, further comprising additional instructions to determine a crankshaft angle at which the rate of change of the pressure exceeds a threshold.

18. The engine system of claim 17, further comprising additional controller instructions to adjust the commanded opening timing of the exhaust valve in response to the crankshaft angle.

19. The engine system of claim 17, where the crankshaft angle is an actual exhaust valve opening timing.

20. The engine system of claim 16, further comprising additional instructions to advance the commanded opening timing of the exhaust valve in response to a catalyst heating request and exhaust valve opening timing determined from the rate of change of pressure in the cylinder being retarded from the commanded opening timing of the exhaust valve.

* * * * *